3,151,843
LIQUID PROPORTIONING AND MIXING DEVICES
John James Cowley, % Canadian Research & Development Foundation, 1434 Queen St. W., Toronto 3, Ontario, Canada
Filed Feb. 17, 1960, Ser. No. 9,276
2 Claims. (Cl. 259—18)

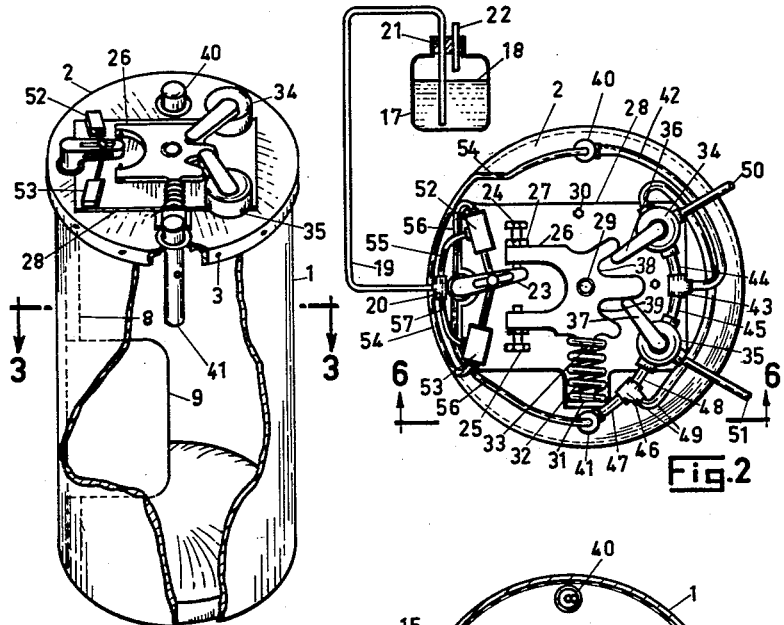

This invention relates to liquid proportioning devices and more particularly to apparatus adapted to proportion and mix a smaller amount of liquid or chemical continuously and accurately into a larger flow of liquid such as for example water chlorinators.

There are many such devices and forms of apparatus now on the market, but most of them have serious shortcomings. A number of these devices use the venturi principle which is not adapted to provide accurate mixing and proportioning under intermittent flow conditions or where the temperature and pressure tends to vary. Other types of apparatus comprise a system of auxiliary mechanical and electrical motors and devices such as pressure switches and pumps which decrease the reliability and tend to make the system expensive and complicated. Still other apparatus makes use of a diaphragm to eject a limited volume of chemical from a cavity so that upon the diaphragm having reached the limit of its movement the apparatus must be shut down to allow the refilling of the cavity thus limiting the system to intermittent usage. Still other apparatus is adapted to accurately measure a volume of one liquid into another but does not provide proper mixing of the two liquids.

It is an object of this invention to provide a liquid proportioning and mixing device that is adapted to automatically and accurately proportion one liquid into another.

It is another object of this invention to provide a liquid proportioning and mixing device adapted to thoroughly admix the additive liquid into the main or carrier liquid.

It is a further object of this invention to provide a liquid proportioning and mixing device that is adapted to be continuous in operation and to maintain its accuracy of proportioning and mixing under conditions of intermittent or varying flow usage.

It is another object of this invention to provide a liquid proportioning and mixing device that is adapted to operate under conditions of widely varying pressures in the main flow pipes, such pressure variations having no effect on the proportioning accuracy or the mixing efficiency of the apparatus.

It is another object of this invention to provide a liquid proportioning and mixing device that is adapted to be simple, rugged and reliable in construction as well as low in cost.

It is another object of this invention to provide a liquid proportioning and mixing device that prevents the additive chemical from contacting any of the main parts of the apparatus until after it is thoroughly mixed and diluted with the main carrier liquid, thus eliminating the need for special materials in the construction of these parts. Other objects and features of this invention will become apparent when taken in conjunction with the accompanying drawings in which:

FIG. 1 is a part sectional perspective side elevation of a liquid proportioning and mixing device embodying this invention, showing the main components thereof.

FIG. 2 is a top plan view of the liquid proportioning and mixing device illustrated in FIG. 1, showing the operating mechanism thereof.

FIG. 3 is a cross-sectional view taken on the line 3—3 of FIG. 1.

FIG. 4 is an enlarged, fragmentary plan view of the operating arm and chemical pumps thereto of the mechanism illustrated in FIG. 2.

FIG. 5 is an elevation of the view shown in FIG. 4.

FIG. 6 is a fragmentary side elevation view of the main flow tube incorporated in this invention shown in FIG. 1.

Referring to FIG. 1 and FIG. 3 a liquid proportioning and mixing device is shown comprising a closed cylindrically shaped pressure vessel 1 to which a top 2 is fastened by means of fastening devices such as a plurality of screws 3. Vessel 1 is adapted to contain internally and parallel to the longitudinal axis thereof two adjacent, flexible, water-tight bags 4 and 5 adapted to divide the internal volume of vessel 1 into two parts, each of bags 4 and 5 having sufficient flexibility to enable it to expand to substantially the full volume of vessel 1 or to contract to a small portion of the internal volume of vessel 1 depending on the proportions of the volumes of liquid carried by bags 4 or 5 respectively. Internally of vessel 1 at 6 is attached a suitably contoured support piece 7 which extends longitudinally for the length of vessel 1, and to which is hingeably attached an operator shaft 8. Shaft 8 has attached adjacent to one side thereof, for a substantial longitudinal length thereof, a wing shaped relatively thin and flat lever 9 extending radially from one side of operator shaft 8 for a distance somewhat more than half of the diameter of vessel 1, lever 9 being directed toward the interior of the vessel and extending longitudinally within the vessel to a distance from the bottom of vessel 1 at least equal to or larger than the radius of vessel 1, and likewise extending longitudinally in an upward direction to within a distance from the top 2, equal to or greater than the radius of vessel 1. A contoured piece of suitable material 10 is fastened to the inner wall of the vessel 1 at 11, this being diametrically opposite support piece 7. Support piece 10 extends longitudinally for the length of vessel 1. The outer surfaces of the adjacent sides of bags 4 and 5 are covered by sheets 12 and 13 which are made from a tough flexible material that is substantially larger in area than the adjacent sides of the bags 4 and 5 so that sheet 12 extends from the vessel wall at 15 over support piece 7 and lever 9 to support piece 10 and then to a position 15a on the vessel 1 wall while protective sheet 13 runs from position 16 on the wall of vessel 1 around by support piece 7 and lever 9 thence over support piece 10 to a position 16a on the wall of vessel 1. The protective sheets 12 and 13 extend longitudinally, continuing for a substantial distance on to the bottom of vessel 1 and on to the top 2. The apparatus shown on FIG. 2 also includes a vessel 17 made from suitable material to contain liquid chemical 18. A tube 19 preferably made from suitable material and that is resistant to the chemical 18 used, runs from T piece 20 through stopper 21 and extends downward to within a short distance from the bottom of vessel 17. A vent tube 22 also passes through and terminates a short distance below stopper 21.

Referring to FIG. 2, shaft 8 has formed on its upper end a crank 23 which on sweeping through an arc engages one of two oppositely located set screws 24 and 25 which are threaded into toggle piece 26, and secured by lock nuts 27. Toggle piece 26 is made from a flat plate section of suitable material and is rotatably attached on base plate 28 by pivot piece 29. Base plate 28 is also made from suitable rigid flat section and is attached to top 2 by a plurality of fasteners such as screws 30. A lug 31 is attached to base plate 28 and carries a spring 32 which engages and exerts a force on lug 33 which is formed on and is part of toggle piece 26. Two three way valves 34 and 35 of conventional design are rigidly attached to base plate 28 and are oriented so that their operating levers 36 and 37 respectively, engage two detents 38 and 39 respectively, which are formed in toggle piece 26. T fittings 40 and 41 communicate with the interior of water-tight bags 4 and 5 respectively. Tube 42 connects from fitting 40 to T piece 43, which in turn connects to valve 34 by tube 44 and to valve 35 by tube 45. Fitting 41 is connected to T piece 46 by tube 47. T piece 46 connects to valve 35 by tube 48 and to valve 34 by tube 49. Tube 50 connects to valve 34 and serves as the main carrier liquid outlet while tube 51 connects to valve 35 and is the inlet for the main carrier liquid. Tubes 44, 45, 48 and 47 should be preferably constructed of rigid materials while tubes 42, 50, 49 and 51 may be constructed of either flexible or rigid materials. Chemical pumps 52 and 53 are conventional plunger type or diaphragm type positive displacement pumps and are constructed from materials that are chemically resistant to the chemical 18 that is used. Pumps 52 and 53 are pivotably mounted on base plate 28 so that they have some freedom of rotation in the horizontal plane. Pump 52 is connected to fitting 41 by a suitable flexible tube 56 and to T piece 20 by tube 55. Pump 53 is connected to fitting 40 by tube 54 and to T piece 20 by tube 57. The above tubes 54, 55, 57 and 56 are made from a suitable flexible material that is resistant to the chemical 18.

Referring to FIGS. 4 and 5, the crank 23 contains a vertical slot 58 passing through its depth and running for the greater portion of its length, and similarly a horizontal slot 59 passing through its width and running for the greater portion of its length is shown connected to the plunger arms 60 and 61 of the pumps 52 and 53 respectively. The outer ends of plunger arms 60 and 61 are fitted with eyelets 62 and 63 which are adapted to fit into the slot 59 from opposite sides and overlap so that the eyelets 62 and 63 are in vertical alignment with the slot 58. A pivot stud 64 is adapted to fit slideably into the slot 58 by passing through the eyelets 62 and 63 to thread into a nut 65, thus providing means for clamping the pivot stud at any position along the slot 58. The pumps 52 and 53 are fitted with pivot studs 66 and 67 on their lower sides and are adapted to fit into and to rotate in holes 68 and 69 which are located in base plate 28 as shown.

Referring to FIG. 6, the fitting 41 together with its associated parts is shown, this being similar in every respect to fitting 40 and its associated parts. The threaded lower portion of fitting 41 passes through the top 2 until its shoulder rests against the upper surface of top 2 while the ring nut 71 is adapted to force a flange 72 of the fitting 41 against O-ring 73 which in turn is forced against the flexible bag material 5 and the inner surface of top 2 so as to form a liquid tight seal at this point. The flexible mixing tube 74 is adapted to be clamped to an internal groove 75 in fitting 41 by an expanding spring clip 76. Mixing tube 74 is of a length equal to about eight times its diameter, and is sealed at its lower end and has an opening 77 which has an area approximately equal to the internal area of tube 47. Flexible tube 78 is of about 1/10 of the diameter of tube 74 and is fastened to the inner wall of tube 74 by means of cement or suitable clips in a position diametrically opposite to opening 77. The chemical feed tube 56 extends downwardly within tube 74 and substantially coaxially therewith to terminate in an open end adjacent to but spaced apart from the bottom wall of tube 74. Tube 56 is fitted with a flange 79 to adapt it to be clamped in place within fitting 41 by means of threaded hollow fitting 80.

The function of the equipment is as follows: in most applications it is expected that the main or carrier liquid will be supplied from a system under pressure to the tube 50 while the additive liquid will be placed in the container 17. The equipment however could be designed so that the flow entering by tube 19 would be approaching the volume of flow entering by tube 50. The pumps 52 and 53 may be of the plunger type, or diaphragm type or other positive displacement type. Also the additive liquid might be supplied to tube 19 from a pressure system or from an elevated gravity tank etc. Also the apparatus described might be used only as the proportional metering device and as the motive force to inject the additive liquid into some other external part of the piping system. For the purposes of this specification however it will be assumed that the equipment is adapted to the automatic chlorination of a household or other water supply system.

Vessel 17 will, in this application be filled with a chlorinating liquid such as sodium hypochlorite while tube 50 will connect to the water supply pressure system and tube 51 will connect to the household plumbing system. If now one of the household plumbing system taps is opened, then water will flow from bag 4 through a mixing tube similar to that shown in FIG. 6 to fitting 40 then through tube 42 to T piece 43 to tube 44 through valve 34 to tube 50 and thence to the plumbing system. As the water flows out of bag 4 an equal volume flows from the pressurized supply system through tube 51 to valve 35, through tube 48 to T piece 46 to fitting 41 then through mixing tube 74 and out through the opening 77 into bag 5. As the flow continues the lever 9 is rotated in an anti-clockwise direction by the pressure of water on one side thereof in bag 4 and thereby through shaft 8, rotates crank 23 in an anti-clockwise direction. Crank 23 in turn engages set screw 24 which causes toggle piece 26 to rotate about pivot 29 in a clockwise direction until the rotational bias applied by spring 32 changes from counter clockwise bias to a clockwise bias on passing through a dead centre position, at which time the spring bias quickly moves the toggle piece 26 to its limit in a clockwise direction. This by the engagement of detents 38 and 39 with valve operating arms 36 and 37 respectively, operates the valves 34 and 35 so that the flow through each of the valves 34 and 35 is switched to alternate bags. This directs the inflowing water to flow through tube 51 to valve 35 to tube 45 into T piece 43 then through tube 47 into fitting 41 and thence into bag 4, while the outflowing water will flow from fitting 41 through tube 47 to T piece 46 through tube 49 to valve 34 and out through tube 50 to the plumbing system. The lever 9 now moves in a clockwise direction until at a certain preset limit the above described action of the toggle piece 26 is repeated in the opposite direction and the flows are again reversed to continue the cycle as long as the tap on the plumbing system is kept open.

The chemical 18 is added to the water flowing through the apparatus in the following manner; consider crank 23 to be moving in an anti-clockwise rotational direction so that plunger 61 is being withdrawn from pump body 53 which draws chemical through tube 57 by way of T piece 20 and tube 19 from the vessel 17, while plunger 60 is being moved into pump 52 and thereby ejecting chemical from tube 56 which passes through fitting 41 to the lower end of mixing tube 74 as shown in FIG. 6. In this part of the cycle water is flowing in from tube 47 through tube 74 out of the opening 77 into bag 5. This flow of water through tube 74 induces a smaller but proportional flow of water through tube 78 which on leaving the lower end of tube 78 intermixes with the chemical flowing from the lower end of tube 56 and thence the two intermixed liquids rise up from the bottom of tube 74 and mix with the main water flow leaving the opening 77. The proportion of chemical added to the water can be changed by loosening pivot screw 64 and moving it toward shaft 8 in the slot 58 to decrease the proportion and away from shaft 8 to increase a proportion. Further range of adjustment can be obtained by changing the pumps 52 and 53 to larger or smaller sizes as desired.

From the foregoing description it is apparent that all of the objects of this invention have been achieved. Only positive volumetric displacement is used in each of the main functions and thereby accuracy of proportioning is achieved regardless of flow rate or pressure or viscosity variations etc. Since the wing lever 9 constitutes a relatively large flat surface area a small differential pressure between its two sides will produce a large operating torque on shaft 8, which insures both a high accuracy between a relative position of shaft 8, with regard to the volumetric ratios of liquid contained by bags 4 and 5, as well as a small pressure drop being imposed on the liquid flowing through the apparatus. Therefore, widely fluctuating pressures of the main carrier liquid system will not affect the accuracy or functioning of this mixing and proportioning device.

By partially diluting the additive chemical in a closed end tube which is made from a chemically inert material and then mixing the partially diluted chemical with the main water stream it is apparent that the chemical, in strong concentration, is prevented from coming into contact with any of the main parts of the apparatus.

Since there are relatively few special parts required and these are of a relatively rugged simple nature the manufacturing cost should be quite low. It is also apparent that a single standardized type of operating components such as toggle piece 26, assembly base plate 23, and operating shaft 8 and accessories might be used with a number of different sized pressure vessels 1 or valves 34 and 35 or chemical pumps 52 and 53 etc.

Many variations in design of apparatus embodying the principles of this invention are possible and a great many applications are possible throughout the chemical and process industries as well as the water chlorinating application heretofore described. One such application might be to attach a mechanical counter so that by counting the cycles an accurate volumetric measure of a liquid flow could be obtained.

The embodiments of the invention in which I claim exclusive priority and privilege are defined as follows:

1. A liquid proportioning and mixing device comprising, a rigid cylindrical container; a flexible wall dividing said container longitudinally, forming a first mixing vessel and a second mixing vessel; a first selector valve and a second selector valve; piping means interconnecting said selector valves and said first and second mixing vessels, a water inlet pipe in communication with said first selector valve; a water outlet pipe in communication with said second selector valve; selector lever means on each of said selector valves for simultaneous operation thereof between at least two positions; toggle plate means for activating said selector levers; first and second detent portions in spaced apart relationship extending into said toggle plate means for reception of said selector levers; a crank member actuated by movement of said flexible wall, contacting and rotating said toggle plate means to operate said selector levers; a first chemical pump and a second chemical pump; shaft means interconnecting said first and second chemical pumps with said crank member for actuation of said pumps in response to movement thereof; and piping means connecting said first chemical pump with said first mixing vessel and said second chemical pump to said second mixing vessel, said first chemical pump supplying liquid chemical to said first mixing vessel when said selector valves are in one position, and said second chemical pump supplying liquid chemical to said second mixing vessel when said selector valves are in another position.

2. A liquid proportioning and mixing device as claimed in claim 1, including resilient means biasing said toggle plate means to move said selector levers into one of said positions upon said crank member contacting and rotating said toggle plate means in one direction and to move said selector levers into another of said positions upon said crank member contacting and rotating said toggle plate means in another direction.

References Cited in the file of this patent
UNITED STATES PATENTS

| | | |
|---|---|---|
| 1,720,185 | Miller | July 9, 1929 |
| 2,203,832 | Malburg | June 11, 1940 |
| 2,802,648 | Christensen et al. | Aug. 13, 1957 |
| 2,894,732 | Taber et al. | July 14, 1959 |